(12) United States Patent
Clark et al.

(10) Patent No.: US 7,623,661 B2
(45) Date of Patent: Nov. 24, 2009

(54) MOTION PICTURE ENCODING AND COUNTERFEIT TRACKING SYSTEM AND METHOD

(75) Inventors: William A. Clark, High Wycombe (GB); Joseph C. Wary, Chatsworth, CA (US)

(73) Assignee: Deluxe Laboratories Inc., Los Angeles, CA (US)

( * ) Notice: Subject to any disclaimer, the term of this patent is extended or adjusted under 35 U.S.C. 154(b) by 1060 days.

(21) Appl. No.: 10/657,287

(22) Filed: Sep. 8, 2003

(65) Prior Publication Data

US 2005/0053235 A1    Mar. 10, 2005

(51) Int. Cl.
*H04N 7/167* (2006.01)

(52) U.S. Cl. .............. 380/201; 380/217; 382/232; 705/58; 352/92; 396/318; 396/549; 396/556

(58) Field of Classification Search .......... 380/201, 380/202, 217; 382/232; 705/58; 352/39, 352/92; 396/318, 549, 556
See application file for complete search history.

(56) References Cited

U.S. PATENT DOCUMENTS

| | | | | |
|---|---|---|---|---|
| 3,867,030 A * | 2/1975 | Tanaka | .......... | 355/41 |
| 5,080,479 A | 1/1992 | Rosenberg | | |
| 5,251,041 A | 10/1993 | Young et al. | | |
| 5,303,294 A | 4/1994 | Kimoto et al. | | |
| 5,315,448 A * | 5/1994 | Ryan | .......... | 360/60 |
| 5,574,787 A * | 11/1996 | Ryan | .......... | 380/201 |
| 5,638,292 A | 6/1997 | Rhoads | | |
| 5,680,454 A | 10/1997 | Mead | | |
| 5,699,427 A | 12/1997 | Chow et al. | | |
| 5,710,834 A | 1/1998 | Rhoads | | |
| 5,743,615 A | 4/1998 | McIntyre et al. | | |
| 5,809,160 A | 9/1998 | Powell | | |
| 5,850,481 A | 12/1998 | Rhoads | | |
| 6,005,843 A | 12/1999 | Morimoto et al. | | |
| 6,018,374 A | 1/2000 | Wrobleski | | |
| 6,072,888 A | 6/2000 | Powell | | |
| 6,681,029 B1 | 7/2000 | Rhoads | | |
| 6,122,392 A | 9/2000 | Rhoads | | |
| 6,131,161 A * | 10/2000 | Linnartz | .......... | 713/176 |
| 6,760,463 B2 | 1/2001 | Rhoads | | |
| 6,285,774 B1 | 9/2001 | Schumann et al. | | |
| 6,325,420 B1 | 12/2001 | Zhang et al. | | |
| 6,354,630 B1 | 3/2002 | Zhang et al. | | |
| 6,757,406 B2 | 7/2002 | Rhoads | | |
| 6,920,232 B2 | 7/2002 | Rhoads | | |

(Continued)

FOREIGN PATENT DOCUMENTS

EP    0899688 A3    1/2001

*Primary Examiner*—Matthew B Smithers
*Assistant Examiner*—Paul Callahan
(74) *Attorney, Agent, or Firm*—Greenberg Traurig LLP; Bradley D. Blanche

(57) ABSTRACT

Information is incorporated into motion picture film prints in the form of images or patterns that appear as unobtrusive defects or artifacts. The unique codes are used in association with the print number of the film and are reproduced in video copies of the film made by counterfeiters. This code can be read from the counterfeit copy and can be used to trace the source of the counterfeit. The digits of the print number are recorded in separate frames to increase the difficulty to counterfeiters in detecting and deleting them.

11 Claims, 2 Drawing Sheets

U.S. PATENT DOCUMENTS

| | | |
|---|---|---|
| 6,778,682 B2 | 12/2002 | Rhoads |
| 7,068,811 B2 | 2/2003 | Powell |
| 6,529,600 B1 | 3/2003 | Epstein et al. |
| 6,542,618 B1 | 4/2003 | Rhoads |
| 7,003,132 B2 | 4/2003 | Rhoads |
| 6,678,392 B2 | 6/2004 | Powell et al. |
| 7,206,409 B2 | 6/2004 | Antonelli |
| 7,116,781 B2 | 8/2004 | Rhoads |
| 7,184,570 B2 | 11/2004 | Rhoads |
| 6,975,743 B2 * | 12/2005 | Venkatesan et al. ......... 382/100 |
| 7,062,070 B2 | 6/2006 | Powell et al. |
| 2002/0097870 A1 | 7/2002 | Nelson |

* cited by examiner

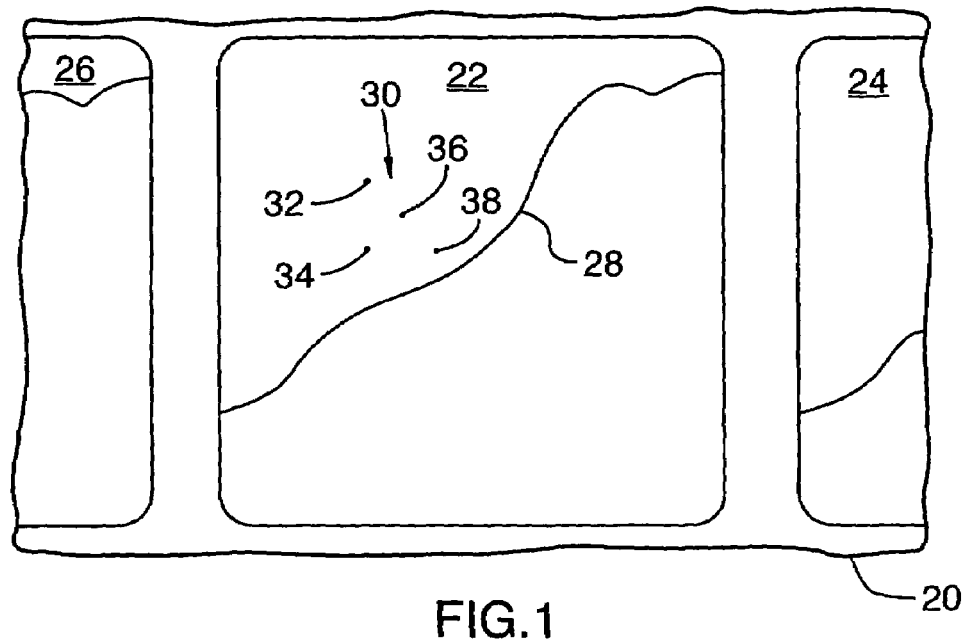
FIG.1
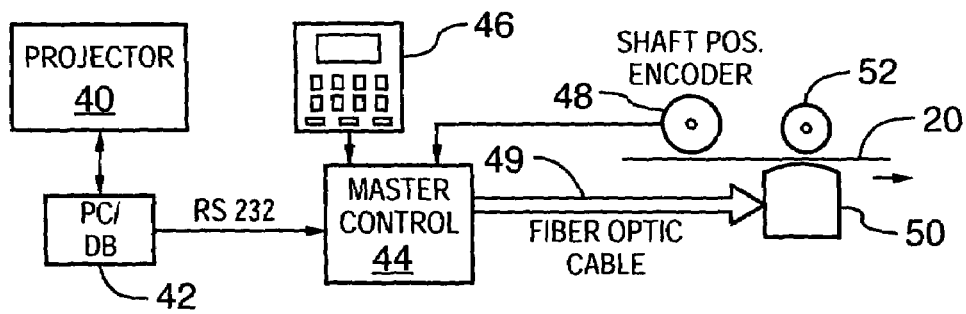
FIG.2
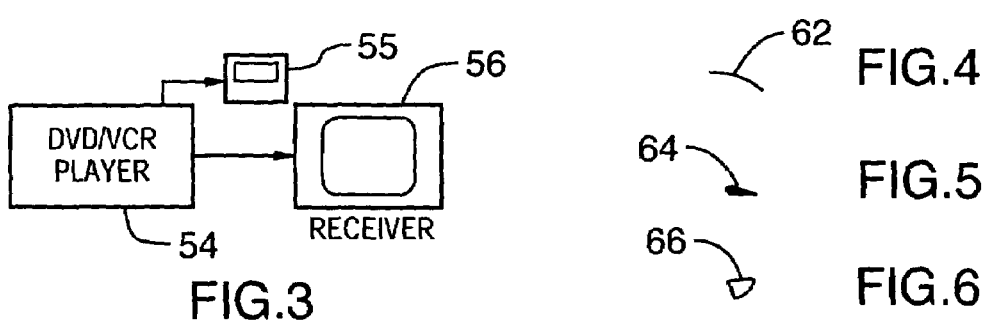
FIG.3
FIG.4
FIG.5
FIG.6
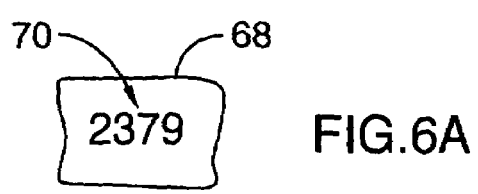
FIG.6A

MOTION PICTURE ENCODING AND COUNTERFEIT TRACKING SYSTEM AND METHOD

This invention relates to the encoding of motion pictures and the tracing of counterfeit motion picture copies, and particularly counterfeit video disks and tapes of motion picture films.

The production and sale of counterfeit copies of motion pictures is a serious problem of long standing in the motion picture industry. Counterfeit video disks or tapes of motion pictures or internet copies being distributed to the public sometimes before a new movie has first been shown in any theater. These counterfeit copies are hard to trace, and it is a difficult job to identify and bring the counterfeiters to justice.

A particularly crude but effective type of counterfeiting is the use of a video camera to copy a motion picture film projected on a motion picture theater screen. The copy made by this technique then is converted to video tape or DVD records, and the records are sold to the public and otherwise distributed, such as by way of the internet.

Attempts have been made in the past to stem the tide of such counterfeits. One such attempt, believed to have been originated by Kodak, is to provide a series of photographic slides, each with a different number on it. These slides have been used to record the number of the print on each motion picture film print as it is being printed. A small grid pattern representing the print number thus is projected on several separate frames of the print as it is being made.

In theory, when a counterfeiter makes a video copy of the film, the pattern also will be copied. Then, after the counterfeit has been distributed, it can be viewed by law enforcement personnel to determine which print of the film was copied. Hopefully, when that print number is traced to the theater or other location in which it was shown (quite often at a preview prior to the formal release of the film) the counterfeiter can be identified as someone who had access to the screening.

The above-identified system has met with only very limited success, for several reasons.

One reason is that sometimes the code symbol would not be copied by the video camera because of the difference in the frame rate between the video camera and the motion picture film. The film is projected at a standard frame rate of twenty-four frames per second, whereas the frame rate for the video camera typically is thirty frames per second, unless the video camera used is a special camera, which is relatively expensive and only infrequently used by counterfeiters. Because of the difference in the frame rates between the camera and the film, some frames of the film were not copied because the shutter of the projector is closed when the video camera frame is being taken.

Another problem with this prior system is that some detail in the pattern is omitted from the copy due cropping, with the video camera not recording the full projected image on the screen.

A significant problem also is caused by the fact that a single pattern was used with variations in the location of elements of the pattern to represent different numbers.

For this reason, the code pattern is difficult to read. It often is necessary to use a template to manually apply to the symbol to determine the relationship of the individual elements in the symbols to one another in order to read them. This is relatively slow and unreliable, and is discouraging to those attempting to track and stop the counterfeiters.

Improvements have been made to the system described above. The slides have been replaced by other means to apply the coded symbols. Such means include an array of LEDs (Light-Emitting Diodes) to form the symbols.

Another improvement has been the repetition of the code symbol on two to four successive frames at each of several locations on the film so as to avoid the problem caused by the difference in frame rates between the motion picture film and the video camera.

However, the resulting system still leaves much to be desired. Prior to the present invention, it still has been difficult and unreliable in reading the code symbols.

In view of the foregoing, it is an object of the present invention to provide a coding and counterfeit tracing system and method which alleviates or solves the foregoing problems.

In particular, it is an object of the invention to provide a coding system and method which is easier and more reliable to use, yet uses symbols which are harder for counterfeiters to find and delete, and yet unobtrusive to the viewer of the film.

It is a further object of the invention to provide such a system and method which is relatively quick, accurate and efficient to use.

It is an object of the invention to facilitate the rapid tracing of the source of counterfeit film copies, leading to the apprehension of those responsible.

In accordance with the present invention, the foregoing objects are satisfied by the provision of a coding system in which each separate digit of the number for each print of a motion picture film is represented by an individual unique code symbol which is recorded in a frame separate from the frames in which each of the other digits appears.

Also, each code symbol is composed of one or more very small images which are made to look like defects or artifacts in the film. They are so small and widely spaced that they are not usually noticeable to the ordinary movie patron, and yet are relatively easy to detect by the trained observer or by pattern recognition equipment.

Furthermore, each digit is repeated in successive frames within the film copy, once in a frame either immediately following the first frame or in a closely subsequent frame to avoid the difference in frame rate problem, and at several different locations along the length of a motion picture film.

In addition, a record is kept of the location of each code symbol in the film print. Then, when a counterfeit copy is viewed, the record is used to aid the investigator in finding the symbols.

The foregoing make it difficult for counterfeiters to detect every code symbol location and to erase all of the code symbols from the film copy.

Specifically, the code symbols can be comprised of a pattern of small, unobtrusive specks which are interspersed with the images appearing on the film so as to be unobjectionable to the viewer. The small specks look similar to small dirt particles, and thus are difficult to find, without knowing where to look.

Alternatively, each of the code elements can have a shape so as to resemble other defects or artifacts, an thus be more difficult for counterfeiters to find. For example, the element may look like a small scratch or color defect. The various types of code elements can be mixed within a single code or symbol, again increasing the difficulty of detecting and erasing them.

Also preferably, each of the marks is of the maximum size which is relatively unobjectionable to the viewer, while being of a size larger than can be eliminated by data compression in a video transfer.

The foregoing and other objects and advantages of the invention will be apparent from or explained in the following description and drawings.

IN THE DRAWINGS

FIG. 1 is an elevation view of a segment of motion picture film illustrating one of the code symbols of the present invention;

FIG. 2 is a schematic block diagram of an encoding system of the present invention;

FIG. 3 is a schematic block diagram of a code reading system of the invention;

FIGS. 4-6 are representations of examples of defects or artifacts usable as code elements in the invention;

GENERAL DESCRIPTION

Figure 7:
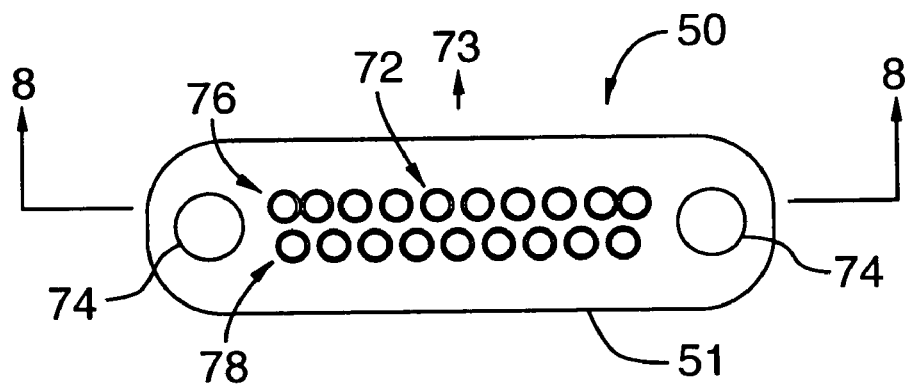
FIG. 7 is a top plan view of a code printing head of the invention.
Figure 8:
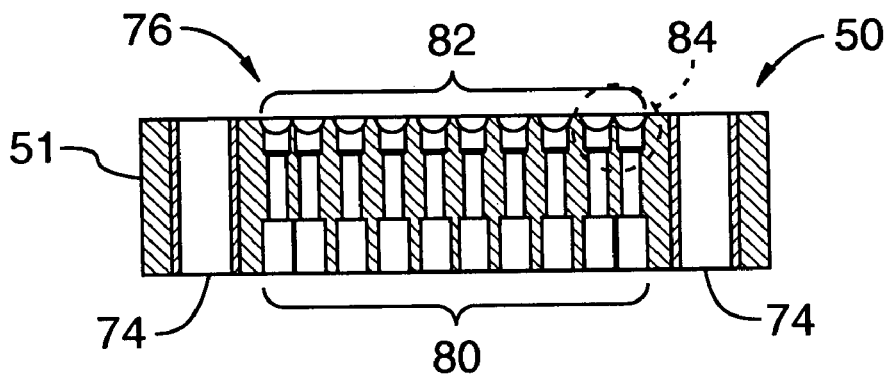
FIG. 8 is a cross-sectional view taken along line 8-8 of FIG. 7.

FIG. 1 shows a segment 20 of a motion picture record medium (e.g., film) in which one frame 22 bears a photographic image, represented by the line 28, and a coded pattern 30 representing an alphanumeric character. One full frame 22 and parts of two adjacent frames 24 and 26 are shown in FIG. 1.

Preferably, the pattern is made of a plurality of specks 32, 34, 36 and 38 in a 3×3 dot matrix, although patterns and code elements other than those described can be used instead, as it will be explained in detail below.

Although any desired information can be encoded, in this invention, it is preferred that the pattern represent one of the digits of the number of the film print of the motion picture in which the frames 22, 24 and 26 appear.

For example, the specks pattern shown may represent the first digit "2" of the print number "2379" which has been given to the print.

In accordance with one aspect of the invention, a different pattern in the matrix, one representing "3" is recorded at a substantial distance along the film strip from the frame 22, from say 10 to 100 feet away. Then, a third pattern representing "7" is recorded another substantial distance away, and a fourth pattern representing "9" is recorded after that.

Each of the numbers also is encoded in one or more other frames near the frame where that number first appears, so that each number appears at least twice in nearby frames, in order to defeat the problem of different frame rates causing missed recording in a video camera.

Preferably, each series of numbers is then repeated several times throughout the length of the film print; e.g., 20 or 30 times in a full length feature film.

Although the coded numbers can be located in a single 20-minute reel of a multi-reel feature film, it is preferred to locate the numbers in more than one or all of the reels, in order to make the counterfeiters' jobs of erasing the codes more difficult.

FIG. 3 shows a typical system used to detect coded patterns in a video copy made from a projection screen. The DVD or VCR record is inserted into a player 54 which then shows the movie on a television receiver 56.

The specks 32, 34, 36, 38 are visible to the naked eye. Therefore, the print number can be read without any special equipment. However, reading is greatly aided by use of a stored record of where the codes are recorded in the film. With the aid of a time code reader and display unit 55, the investigator can fast-forward to the right locale in the tape or disk and search for the right frame.

In this way, the other digits of the print number can be read, the records kept showing the theater to which each print was sent will then identify the theater where the counterfeit copy probably was made, and the search for the counterfeiter is thus narrowed quickly.

The artifacts need not be circular. However, it is preferred that they look like specks of dirt. This prevents them from being too evident to ordinary movie patrons, and makes them harder to find by people who do not know where to look.

Advantageously, small marks other than dots can be used as code elements. FIGS. 4, 5 and 6 show three such marks; a small scratch 62 in FIG. 4; an elongated spot 64 in FIG. 5 and a color artifact 66 in FIG. 6. These can be used singly, or in combination with one another to further disguise the code patterns. In fact, almost any mark which looks like a film defect can be used effectively as a code element.

The code recorder of the present invention, to be described below, also can be used to form alphanumeric characters. As it is shown in FIG. 6A, it is used advantageously to form the print number "2379" on the leader 68 of the film. This makes it easy to check the code number against the print number visually during packing, shipping and other handling of the print.

Recording System

FIG. 2 shows the system used to record the code elements on the film 20. The system includes a projector 40 for displaying the film during a preview in which locations for the codes are determined. Of course, the film can be converted to video tape first, if that is most expedient, and then displayed on a video monitor instead of the projector.

The locations of the code are stored in a personal computer (PC) 42 or a database. The computer 42 delivers control signals to a master control unit 44 used to control the printer in which the recording process is performed.

An encoder accurately reads the position of the printer sprocket and sends corresponding signals to the master control 44.

The code which is seen on the display (46) can be entered into the printing machine, manually or electronically through a network at the start of a printing operation. Afterwards, the master control unit 44 increments the print number automatically for every new print made.

The code images are recorded on the film 20 during the printing process when the film passes between a recording head 50 and a roller. The head 50 receives signals transmitted from a LED array contained in the master control unit 44 through a fiber-optic cable 49. The recording head records the received signals on the film 20 at the precise location directed by the master control 44.

The proper location of each code pattern in the proper location in the proper frame is done under the control of a program prepared by an operator during a preview of the film.

The operator runs the projector until a suitable location for the first code pattern is found. The pattern can be located anywhere where the appearance of minor artifacts is unobjectionable, usually in the upper half of the frame where the sky usually makes a good background.

If desired, specific patterns can be located in specific columns in order to facilitate reading the code.

Then, the first location is stored in memory for use during each printing run.

This procedure is repeated for each other code location until all of the codes and locations have been stored.

Then the printing process starts. The stored locations of the codes are read out and, under the control of the encoder 48, the codes are recorded as the print is being made.

When the next print is started, the print number increments by one, and the process is repeated.

Recording Head

FIGS. 7-10 show the structure of the recording head 50.

Referring first to FIG. 7, the head 50 has a lens holder body 51 with an array 72 of light emitters and mounting holes 74. The light emitters are arranged in two parallel rows 76 and 78, and are staggered with respect to one another so that the emitters from one row are located to fill the spaces between emitters when film travels past the head in the direction of the arrow 73.

Each of the light emitters includes an inlet barrel 80 and an outlet 82.

Figure 9:
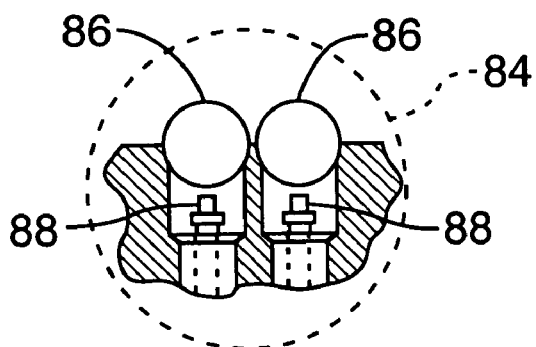
FIG. 9 is an enlarged, broken-away view of a portion of the structure of FIG. 8.

As it is shown in FIG. 9, a spherical ball lens 86 is mounted in each outlet 82. A fiber-optic cable ferrule (not shown) fits into each inlet barrel, and the conductor end 88 (FIG. 9) delivers light from a LED to the ball lens. The lens then focuses the light to reduce the size of the artifacts to be produced, as needed.

The film 20 is spaced closely to the ball lenses (about $15/1000$ inch away) but does not touch them.

Figure 10:
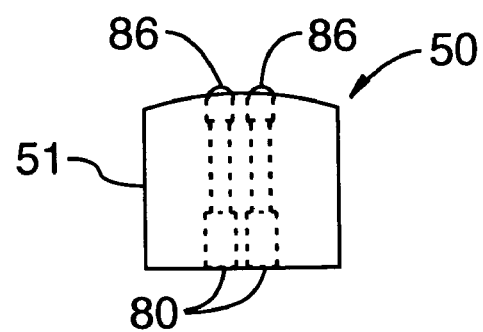
FIG. 10 is a right side elevation view of the structure shown in FIG. 7.

As it is shown in FIG. 10, the upper surface of the body 51 is curved so as to facilitate control of the spacing between the lenses and the film.

By controlling the timing of the operation of the LEDs, not only artifacts and whole numbers like those shown in FIG. 6A can be formed by the recording head, but scratches, spots, and marks of many other shapes can be formed.

The above description of the invention is intended to be illustrative and not limiting. Various changes or modifications in the embodiments described may occur to those skilled in the art. These can be made without departing from the spirit or scope of the invention.

What is claimed is:

1. A motion picture security code application system, comprising:
    (a) code symbol recording equipment for recording code symbols on a motion picture record medium; and
    (b) a control system for controlling said recording equipment to cause it to record on said record medium information comprising a plurality of separate coded symbols, each symbol representing a digit of a multi-digit security code and being recorded in a separate frame of a motion picture recorded on said record medium,
    in which each of said symbols comprises an array of visible marks representing one digit of a print identification number, said marks being large enough to avoid their eradication by the compression means used in a video camera used to make a copy of the motion picture recorded on said record medium when projected onto a motion picture display screen, but small and spaced apart so as to be essentially, unnoticeable by an ordinary viewer of the motion picture, each of said symbols comprising a selected combination of marks from a dot matrix.

2. A system as in claim 1 in which each of said marks is between approximately 0.005 inch and 0.015 inch in diameter.

3. A system as in claim 1 in which said recording equipment includes fiber-optic cables with an exit focusing lens and a controlled light source for sending light through selected ones of said fiber-optic cables to record a pattern of marks on said record medium and thereby form one of said symbols.

4. A system as in claim 3 in which said recording equipment includes means for synchronizing the formation of said marks with the movement of said record medium through a copy recorder for recording the motion picture on said record medium.

5. A system as in claim 4 in which said record medium is motion picture film and said copy recorder is a film printer.

6. A motion picture security code application system, comprising:
    (a) code symbol recording equipment for recording code symbols on a motion picture record medium; and
    (b) a control system for controlling said recording equipment to cause it to record on said record medium information comprising a plurality of separate coded symbols, each symbol representing a digit of a multi-digit security code and being recorded in a separate frame of a motion picture recorded on said record medium,
    in which each of said symbols is composed of one or more small marks made to look like a defect selected from the group consisting of dirt or dust particles; scratches; and color defeats,
    further in which each of said symbols comprises a representation of one digit of a multi-digit print identification number, and a unique identification number is provided for each of a plurality of prints of a motion picture; and
    further in which said medium is motion picture film having a leader, and including a device for recording said identification number on said leader.

7. A system as in claim 6 in which said identification number on said leader is in non-coded alphanumeric form.

8. A method of counterfeit detection comprising the steps of:
    (a) recording within a motion picture film copy an identification number of the copy, said identification member comprising a plurality of digits, each recorded in code form in the visible area of a different frame of a film recorded on said film copy, said different frames being spaced from one another along the length of said film;
    (b) keeping a record of the identification number for said copy and the destination to which it was delivered;
    (c) viewing a suspected counterfeit copy of said film and determining the copy identification number recorded in said suspected counterfeit copy; and
    (d) tracing said copy to said destination to which the copy was delivered.

9. A method as in claim 8 in which each of said digits is in the form of marks forming a pre-selected pattern, each of said defects being as small as possible without making them invisible to the naked eye or being erased by the data compression of a video camera used to copy the motion picture.

10. A method as in claim 9 in which each of said patterns is positioned in a frame so as to give minimum interference with viewing of the motion picture.

11. A method as in claim 10 in which each of said patterns is located in a predetermined position within the frame.

* * * * *